Figure 6:
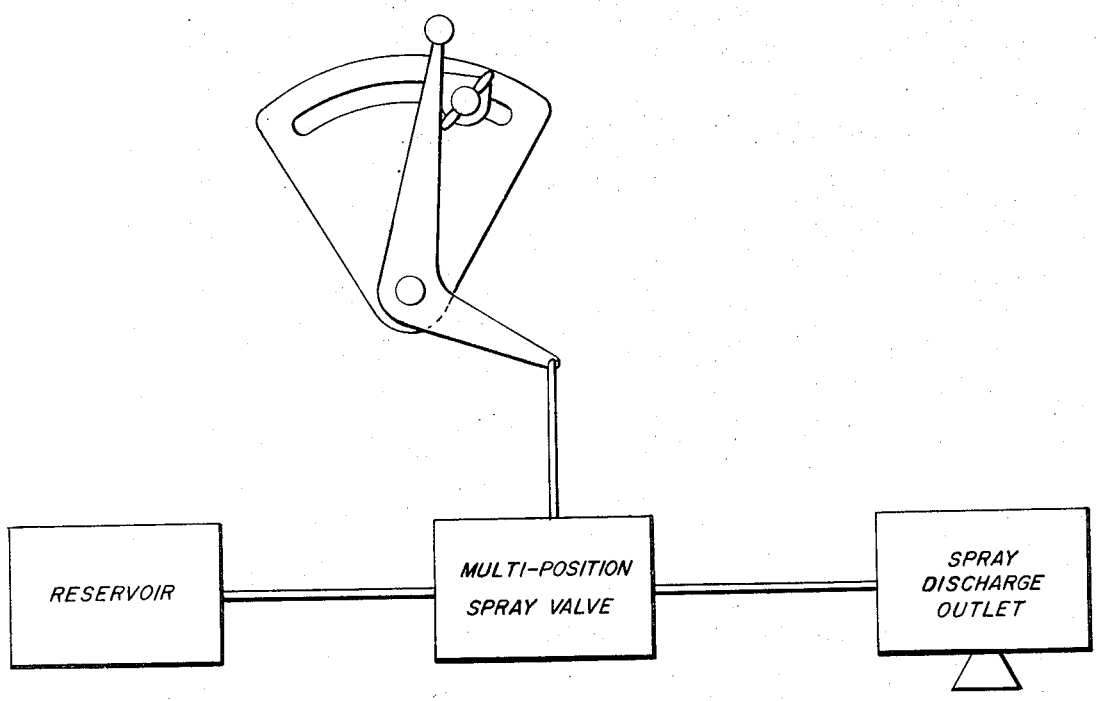

United States Patent [19]

Rogers

[11] 3,813,080

[45] May 28, 1974

[54] METHOD AND DEVICE FOR CONTROLLING A MULTI-POSITION VALVE

[76] Inventor: Kenneth Mathew Rogers, No. 15, Salisbury Dr., Logan Pk., Hatfield, Salisbury, Rhodesia

[22] Filed: Oct. 4, 1972

[21] Appl. No.: 295,046

[52] U.S. Cl................................. 251/285, 74/527
[51] Int. Cl......................... F16k 51/00, G05g 5/04
[58] Field of Search .......... 251/284, 285, 260, 280, 251/286, 287, 288; 74/526, 527, 522, 534

[56] References Cited
UNITED STATES PATENTS
| | | | |
|---|---|---|---|
| 1,473,481 | 11/1923 | Kleist | 251/284 X |
| 1,516,945 | 11/1924 | Basel | 251/285 X |
| 1,704,209 | 3/1929 | Parry | 251/285 |
| 2,672,156 | 3/1954 | Lecarmure | 251/285 X |
| 2,757,546 | 8/1956 | Kendall et al. | 251/285 X |
| 3,372,842 | 3/1968 | Van Der Lely | 251/285 X |

*Primary Examiner*—Alan Cohan
*Assistant Examiner*—Ira S. Lazarus
*Attorney, Agent, or Firm*—Ladas, Parry, Von Gehr, Goldsmith & Deschamps

[57] ABSTRACT

A device and method for controlling a multiposition valve to regulate flow from a spray mechanism, which involves positioning a stop means in the path of movement of a valve actuating lever and which stop means provides two predetermined stop positions of the lever which can be selected alternatively or sequentially.

5 Claims, 6 Drawing Figures

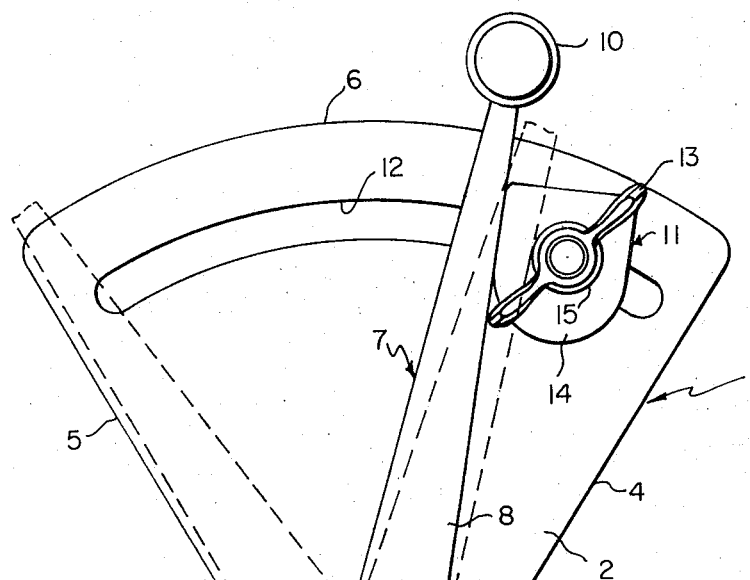
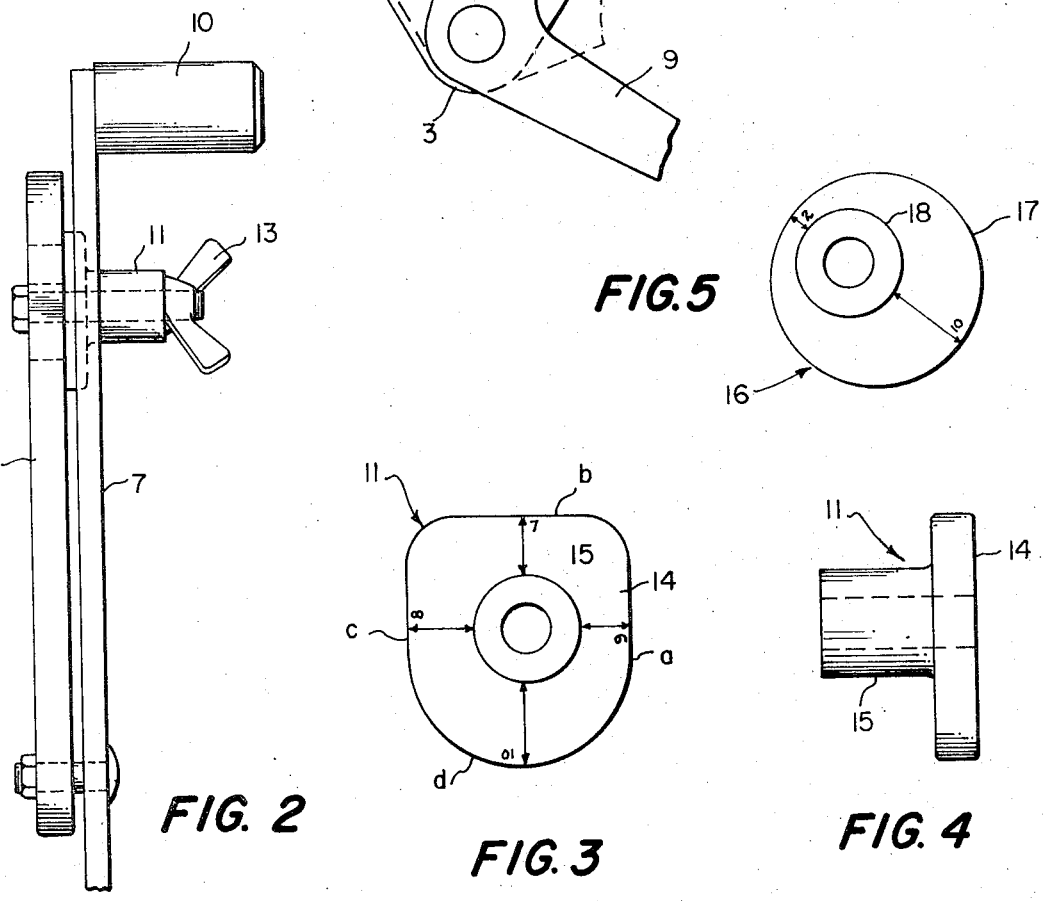

METHOD AND DEVICE FOR CONTROLLING A MULTI-POSITION VALVE

BACKGROUND OF THE INVENTION

1. Field of art

The present invention relates to a method and device for controlling a multi-position valve, and more particularly, to such method and device for setting a multi-position valve to a predetermined open position to regulate discharge of fluid from a spray mechanism in an aircraft during a spraying operation.

2. Description of Prior Art

As would be expected, wind direction and velocity play a part in the distribution of spray particles particularly those originating from fixed-wing aircraft.

However, ground slope also plays a significant role and may considerably add to the pilot's problems.

Where any of the factors noted above are present there are likely to be disturbances in the spraying pattern.

In extreme cases spraying operations may have to be suspended entirely or more expensive programming used for example when a moderate wind is blowing directly down a sloping field. In such conditions although the upwind run of the aircraft poses few problems and spray patterns may be easily regulated the downwind return pass may have to be flown at such high ground speeds that the spray pattern thins out to the point of relative uselessness. A reason for this is that although the pilot has means whereby to regulate the amount of fluid being dispensed from the reservoir to the spray generators, presently used systems depend largely on the aircraft engine speeds to maintain pump pressures.

When adverse conditions prevail, for example on downwind passes, while engine revolutions will remain constant with the throttle closed, the propeller may "windmill" so that the separate fan driven pump loses efficiency and fails to maintain pressure. The pilot will then have to divert to his spray controls his already fully engaged attention in an effort to reset the controls for optimum delivery. Not only is this distraction highly dangerous but it tends to induce hit and miss regulation of the spray pattern on the downward pass.

It is an object of this invention at least to minimize the difficulties experienced with present systems.

Other objects of the invention will emerge from the description which follows.

SUMMARY OF THE INVENTION

In accordance with the present invention, I provide in an apparatus for controlling a spray mechanism including a multi-position valve in a conduit between a reservoir of spray material and spray discharge outlet, and a lever mounted for pivotal movement to control the position of said valve, the improvement comprising a device which includes a cam-like member positionable at any preselected point in the path of movement of the lever, said member having stop faces engageable by the lever to arrest movement thereof in one of two predetermined valve open positions.

The present invention further provides a method of controlling a multi-position valve to regulate flow from a spray mechanism, which comprises providing a multi-position valve in a supply line between a reservoir for spray material and spray discharge outlets, and moving an operating lever between valve closed and valve open positions, the latter being determined by means interposed in the path of movement of the lever and which provides two predetermined stop positions of the lever which can be selected alternatively or sequentially.

BRIEF DESCRIPTION OF THE DRAWINGS

FIG. 1 is an elevation view of the spray control apparatus of the present invention;

FIG. 2 is a side elevation view of the apparatus shown in FIG. 1;

FIG. 3 is a plan view of the cam-like member in accordance with the present invention;

FIG. 4 is a side view of the member illustrated in FIG. 3; and

FIG. 5 is a plan view of another form of the cam-like member.

FIG. 6 is a schematic drawing of the apparatus of the present invention.

DESCRIPTION OF THE PREFERRED EMBODIMENT

Referring to the drawings, the invention is embodied in valve operating apparatus, generally designated 1, which includes a quadrant member 2 formed of flat heavy gauge metal in the form of a quadrant of a circle, that is, the member 2 has the configuration of a segment of a circle, Thus, the quadrant member 2 has an apex 3 and sidewalls 4,5 connecting the apex 3 to its outermost part or endwall 6 which is arcuate. There is pivotally connected to the quadrant member at its apex 3 a lever 7, preferably in the form of a bell crank. Any of the conventional connecting means can be utilized to form the pivot of the lever of the apex of the quadrant member. The lever extends in a plane parallel to one face of the quadrant member and one arm 8 thereof is adapted to pivot in an arc between positions with the side walls of the quadrant member. The lever 7 acts as a valve operating control through connections (not shown) from the other arm 9 of the bell crank lever illustrated in FIG. 1 to a multi-position valve. It should be understood however that arrangements other than a bell crank lever may be utilized to operate a multi-position valve upon pivotal movement of the lever 7.

In one extreme position of the lever 7 where it is registered over one side wall 5 of the quadrant member 2, as shown in dotted lines at the left hand side of FIG. 1 the valve would be in a closed position. Further, the lever would preferably be normally spring biased to such position. The lever 7 is pivoted toward the right hand side of the quadrant member 2 (against the spring bias) to open the valve to a desired valve open position. A handle 10 may be provided at the free end of the lever 7 to facilitate gripping the lever 7 for pivotal movement thereof between the valve closed and valve open positions.

A cam-like member 11 is secured to the quadrant member 2 in the path of movement of the lever 7. The cam-like member 11 can be secured to the quadrant member through a curved elongated slot 12 in the quadrant member by any conventional quick-acting releasable connecting means such as a wing nut 13. The cam-like member 11 comprises a flange portion 14 having a cylindrical shank portion 15 projecting therefrom. The cam-like member 11 is positioned so that the flange portion 14 abuts the face of the quadrant member 2 on which the lever 7 is pivoted. The flange portion 14 is formed to have sufficient thickness to project into the plane of the lever 7 to thereby interfere with pivotal movement of lever 7 toward its valve open position. The shank portion 15 of the cam-like member 11 projects outwardly beyond the plane of the lever 7. The position of the cam-like member 11 relative to the valve open position of the lever 7 is adjustable by releasing the wing nut 13, moving the cam-like member 11 to any desired location along the slot 12 in the quadrant member 2 and then tightening the wing nut 13 to retain the cam-like member 11 at that location.

The flange portion 14 of the cam-like member 11 has any desired number of cam faces formed in its outer edge. The cam-like member 11 illustrated in FIG. 3 is provided with four cam surfaces, a, b, c, d, that is, the outer edge is formed to have four surfaces, each of which is spaced from the central axis of the shank portion 15 a different predetermined distance.

The flange portion 14 of the cam-like member 11 acts as a stop for the lever 7, but its thickness does not prevent further movement of the lever to override the interposed cam face of the flange portion if desired. Such over-riding movement of the lever 7 may be accomplished by exerting a force on the handle away from the quadrant member 2, whereby resilience of the lever will allow a slight outward movement of the lever to clear the flange portion of the cam-like member. Further pivotal movement of the lever can then be made toward the valve open position until the lever meets the surface of the shank portion of the cam-like member (as shown in dotted lines near the right hand side of FIG. 1). The surface of the shank portion is spaced from the cam face of the flange portion a predetermined distance. For example as illustrated in FIG. 3 the four cam faces a, b, c, d, of the flange portion are spaced from the surface of the shank portion 6mm, 7mm, 8mm and 10mm respectively.

It will thus be clearly understood that the cam-like member 11 acts in effect as a two-position stop for the pivotal lever 7 and can be located at any desired distance along the path of movement of the lever between the valve closed position and the valve open position. The "one" stop position of the cam-like member is spaced from the "two" position of the cam-like member by a distance determined by the distance between any one of the cam faces and the surface of the projecting shank portion. The desired distance between the cam face and the surface of the shank portion can be selected by rotating the cam-like member 11 about its central axis while the wing nut 13 is loosened until a desired cam face is positioned to be in line with the leading edge of the lever 7. Thus, in the illustrated embodiment, the cam-like member 11 can be rotated until any one of the four cam faces is aligned for contact with the edge of the lever 7, and the cam face chosen will allow a specific amount of overriding movement of the lever between its contact with the cam face and its contact with the surface of the projecting shank portion.

A slightly different form of the cam-like member is illustrated in FIG. 5, and which can be used in place of cam-like member 11 in the preferred embodiment of the present spray control apparatus. Cam-like member 16 is a disc 17 having a shank portion 18 extending therefrom with the central axis of shank portion 18 offset from the center of the disc 17. The outer edge of the disc may be circular and comprises the cam faces thereof. The shank portion can be located relative to the center of the disc so that the smallest distance between the surface of the shank portion and the cam face is for example 2 mm and the largest distance is 10 mm. Thus, while the disc has only a single stop face, the eccentric arrangement of the shank portion provides in effect, an infinite range between these two limits. However, marks on the face of the disc can be provided to indicate standard setting positions, say of 4, 6, 8 and 10 mm. With such marks or indicator lines, a pilot can adjust the cam-like member initially to a desired distance and will be able to readily make a specific adjustment thereof.

OPERATION OF THE INVENTION

In use, the cam-like member is first positioned at a desired location along the slot in the quandrant member and with a particular cam face in alignment for contact by the lever whereupon the wing nut is tightened to retain the cam-like member in such location. A pilot before leaving the ground will make an analysis of the wind conditions and the terrain of the area to be sprayed. A determination is made by the pilot of the required open position of the multi-position valve controlling the spray mechanism to give the necessary volume of spray material on a normal traverse of a leg of the spray pattern, for example, an upwind pass. The cam-like member is then moved laterally along the slot in the quadrant member to a desired location and is rotated to position a selected cam face in the path of the lever which will permit movement of the lever from its valve closed position into contact with the cam face at a position which will control the spray mechanism to furnish the desired flow of spray material. The selected cam face is determined by the particular requirements of that flight for a differential positioning of the lever to its second over-ride position for the downwind pass. Thus the wind conditions and the slope of the terrain may for example dictate that on the downwind pass an addition opening of the multi-position spray valve will be required which can be made by a further movement of the lever of say 8mm. Thus, the cam face (c) will be turned toward the lever contacting position prior to takeoff by the pilot on the initial set up of the present application. During flight with this invention all that is required by the pilot for operation of the spray valve is movement of the lever from valve "closed" position until contact is made by the lever with the cam face of the cam-like member at the desired valve open position for the upwind pass. Upon turning into the downwind pass, the pilot only has to pull on the handle to move the lever over the edge of the cam face and pivot the lever further into contact with the surface of the projecting shank portion to provide the desired additional opening of the spray valve. This can be done by the pilot without diverting his attention from the maneuvers of flight, and even without actually looking at the spray control mechanism.

A spray control mechanism usually has various indicator marks or notches to denote a valve open position to provide a predetermined number of gallons per acre of spray material under optimum conditions. With this invention a selected cam face of the cam-like member can be positioned at a particular one of such marks or notches to meet the normal spray requirements. However, if adverse conditions are present during one direction of flight such as the downwind pass the pilot could override the cam face and push the lever forward into contact with the shank portion to its ultimate stop position whereat the spray valve will provide the same spray pattern as in the other flight direction under the initially selected optimum conditions.

It will be further understood that if conditions change radically during a particular flight with the present invention, the pilot could readjust the position of the cam-like member to provide new valve control positions for the valve operating lever.

Inasmuch as the present invention is subject to many variations, modifications and changes in detail, it is intended that all matter contained in the foregoing description or shown in the accompanying drawing shall be interpreted as illustrative and not in a limiting sense.

With reference to the foregoing description of the invention,

I claim:

1. In an apparatus for controlling a spray mechanism for use in agricultural aircraft, including a multiposition valve in a conduit between a reservoir of spray material and spray discharge outlet, and a lever mounted for pivotal movement to control the position of said valve, the improvement comprising a device which includes a cam-like member positionable at any preselected point in the path of movement of the lever, said member having a stop face engageable by the lever to arrest movement thereof in one of two predetermined valve open positions, the cam-like member having a flange portion and a projecting shank portion, each of which has a surface engageable by the valve actuating lever at a predetermined valve open position.

2. A device as defined in claim 1, wherein the lever is mounted on a quadrant member for movement between valve closed and valve open positions, the flange portion of the cam-like member being located in the plane of movement of the lever.

3. A device according to claim 2, wherein the lever is movable out of its normal plane of pivotal movement to override the stop surface on the flange portion, whereby the lever is movable into contact with the surface of the projecting shank portion of the cam-like member.

4. A device as defined in claim 3, wherein the flange portion of the cam-like member has cam surfaces formed at its outer edge, each of which is a different distance from the central axis of the projecting shank portion thereof.

5. A device according to claim 2, wherein the lever is pivotally attached to the quadrant member at a point near the apex of said member, and the plane of pivotal movement of the lever is substantially parallel with the surface of the quadrant member.

* * * * *